（12）United States Patent
Naserian et al.

(10) Patent No.: US 10,220,850 B2
(45) Date of Patent: Mar. 5, 2019

(54) VEHICLE PROPULSION SYSTEMS AND METHODS

(71) Applicant: GM GLOBAL TECHNOLOGY OPERATIONS LLC, Detroit, MI (US)

(72) Inventors: Mohammad Naserian, Windsor (CA); Allan K. Lewis, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 109 days.

(21) Appl. No.: 15/418,858

(22) Filed: Jan. 30, 2017

(65) Prior Publication Data

US 2018/0215386 A1 Aug. 2, 2018

(51) Int. Cl.
| | |
|---|---|
| *B60W 30/18* | (2012.01) |
| *F02D 41/00* | (2006.01) |
| *F02D 41/12* | (2006.01) |
| *F02D 41/04* | (2006.01) |
| *G06K 9/00* | (2006.01) |
| *G08G 1/0967* | (2006.01) |

(52) U.S. Cl.
CPC ... *B60W 30/18154* (2013.01); *F02D 41/0087* (2013.01); *F02D 41/042* (2013.01); *F02D 41/123* (2013.01); *G06K 9/00791* (2013.01); *G08G 1/09675* (2013.01); *G08G 1/096725* (2013.01); *G08G 1/096783* (2013.01); *F02D 2200/50* (2013.01); *F02D 2200/701* (2013.01)

(58) Field of Classification Search
None
See application file for complete search history.

(56) References Cited

U.S. PATENT DOCUMENTS

| | | | | |
|---|---|---|---|---|
| 5,451,820 | A * | 9/1995 | Gotoh | B60K 31/0008 123/179.4 |
| 6,405,106 | B1 | 6/2002 | Sheth et al. | |
| 6,629,515 | B1 * | 10/2003 | Yamamoto | B60K 6/485 123/179.4 |
| 7,404,784 | B2 * | 7/2008 | De Mersseman | B60W 10/06 477/200 |
| 8,192,327 | B2 | 6/2012 | Gibson et al. | |

(Continued)

OTHER PUBLICATIONS

Tahmasbi-Sarvestani, A., Kazemi, H., Fallah, Y., Naserian, M. et al., "System Architecture for Cooperative Vehicle-Pedestrian Safety Applications Using DSRC Communication," SAE Technical Paper 2015-1-0290, 2015, doi:10.4271/2015-1-0290.

(Continued)

*Primary Examiner* — Timothy Hannon
(74) *Attorney, Agent, or Firm* — Quinn IP Law

(57) ABSTRACT

A host vehicle includes a combustion engine configured to provide a propulsion torque to satisfy a propulsion demand. The vehicle also includes at least one sensor configured to detect a position of a reference vehicle. A vehicle controller is programmed to determine a path between a current host vehicle location and an upcoming intersection. The controller is also programmed to forecast a path clearance time at which the host vehicle is able to traverse the intersection in response to sensor data indicating the reference vehicle moving within the path ahead of the host vehicle. The controller is further programmed to deactivate the engine prior to a host vehicle stop based on the path clearance time being greater than a time threshold.

19 Claims, 9 Drawing Sheets

(56) References Cited

U.S. PATENT DOCUMENTS

| | | | |
|---|---|---|---|
| 8,239,076 B2 | 8/2012 | McGarry et al. | |
| 8,290,637 B2 | 10/2012 | Krupadanam et al. | |
| 8,392,112 B2 | 3/2013 | Bradbum et al. | |
| 8,606,483 B2 | 12/2013 | Krupadanam et al. | |
| 9,067,589 B1 | 6/2015 | Zhao et al. | |
| 9,121,722 B1 | 9/2015 | Yu et al. | |
| 9,994,230 B2* | 6/2018 | Tosaka | B60W 30/1886 |
| 2006/0064232 A1 | 3/2006 | Ampunan et al. | |
| 2010/0100268 A1* | 4/2010 | Zhang | B60W 30/09 |
| | | | 701/25 |
| 2011/0071746 A1* | 3/2011 | O'Connor Gibson | F02N 11/0837 |
| | | | 701/101 |
| 2012/0083960 A1* | 4/2012 | Zhu | G06T 7/223 |
| | | | 701/23 |
| 2013/0179047 A1* | 7/2013 | Miller | B60W 30/09 |
| | | | 701/70 |
| 2013/0251194 A1* | 9/2013 | Schamp | G06T 7/11 |
| | | | 382/103 |
| 2013/0289824 A1* | 10/2013 | Mudalige | G08G 1/167 |
| | | | 701/41 |
| 2013/0297124 A1* | 11/2013 | Be | G06F 17/00 |
| | | | 701/22 |
| 2015/0084758 A1* | 3/2015 | Mitts | B60Q 5/006 |
| | | | 340/438 |
| 2015/0151725 A1* | 6/2015 | Clarke | B60W 30/00 |
| | | | 701/28 |
| 2016/0096519 A1* | 4/2016 | Goudy | B60W 10/20 |
| | | | 701/41 |
| 2016/0368492 A1* | 12/2016 | Al-Stouhi | B60W 30/18154 |

OTHER PUBLICATIONS

U.S Department of Energy, "Driving More Efficiently", Extracted from: https://www.fueleconomy.gov/feg/driveHabits.jsp on Aug. 12, 2016; 4 pages.

Paul R. Windover et al., Argonne National Laboratory, "Stop and Restart Effects on Modern Vehicle Starting System Components", Apr. 2015; 28 pages.

* cited by examiner

VEHICLE PROPULSION SYSTEMS AND METHODS

TECHNICAL FIELD

The present disclosure relates to controls of vehicle propulsion systems using geolocation data.

INTRODUCTION

Vehicle connectivity provides data-rich information sources which have been used for user convenience and safety features. Additionally the proliferation of vehicle onboard sensors provides more layers of information. Propulsion system operation largely remains constant in spite of the availability of such information. Any adjustments are often reactive in nature and may result in less than fully optimal propulsion system operation.

SUMMARY

A host vehicle includes a combustion engine configured to provide a propulsion torque to satisfy a propulsion demand. The host vehicle also includes at least one sensor configured to detect a position of a reference vehicle. A vehicle controller is programmed to determine a path between a current host vehicle location and an upcoming intersection. The controller is also programmed to forecast a path clearance time at which the host vehicle is able to traverse the intersection in response to sensor data indicating the reference vehicle moving within the path ahead of the host vehicle. The controller is further programmed to deactivate the engine prior to a host vehicle stop based on the path clearance time being greater than a time threshold.

A method of controlling a propulsion system of a host vehicle includes receiving data indicative of a location and a trajectory of a reference vehicle, and determining a path between a current host vehicle location and an upcoming traffic stop location. The method also includes forecasting an intervening stop location of the host vehicle in response to the reference vehicle being along the path ahead of the host vehicle. The method further includes reducing an engine output prior to the host vehicle arriving at the intervening stop location based on a path clearance time being greater than a time threshold.

A host vehicle includes a combustion engine configured to provide a propulsion torque to satisfy a propulsion demand and a transceiver configured to receive data from at least one external device. The host vehicle also includes a controller programmed to receive data from a traffic device indicative of an upcoming traffic signal state. The controller is also programmed to calculate a duration of the host vehicle at a stop location based on the upcoming traffic signal state. The controller is further programmed to reduce engine output prior to arrival at the traffic device in response to the stop duration being greater than a time threshold.

DETAILED DESCRIPTION

Figure 1:
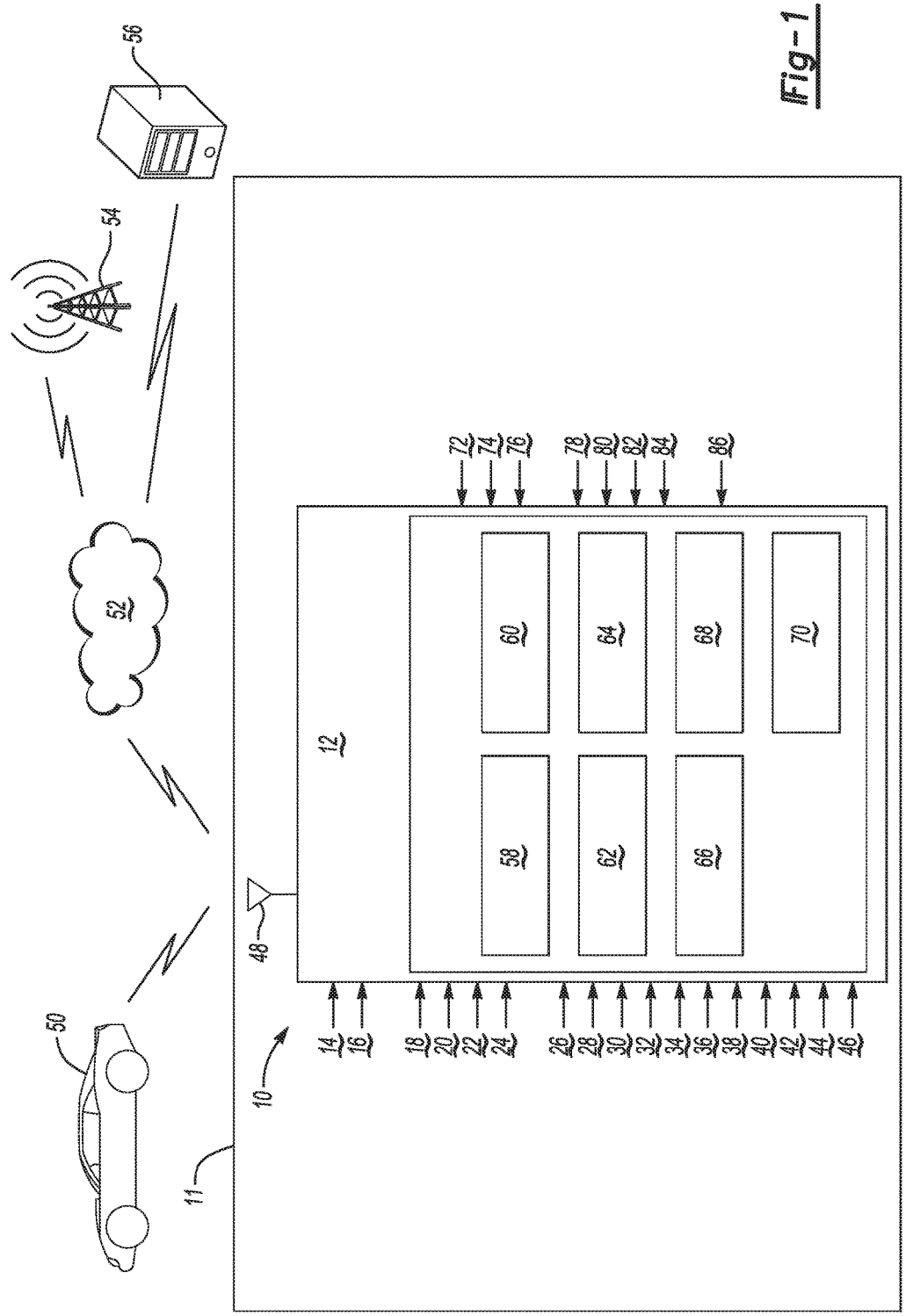
FIG. 1 is a system diagram of a propulsion control system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Connected and/or automated vehicles (CAVs) create unique opportunities to further reduce energy consumption and energy-related emissions. These opportunities may relate to a synergic combination of the advance in-vehicle propulsion system control technologies which utilize vehicle connectivity and automation technologies. Disclosed herein is an optimal and practical solution that incorporates connectivity information into current vehicle control systems to design an "information rich" propulsion control systems that co-optimize the vehicle dynamics and engine performance. In some examples, a propulsion system controller proactively seeks the opportunities, within the constraints of emissions and driveability, to execute most fuel-efficient propulsion system operations including, but not limited to, combinations of running at "sweet spots" (i.e., efficient engine operating points), aggressive deceleration fuel cutoff, aggressive start-stop, aggressive cylinder deactivation, smart transmission shift, smart accessory load management, and smart thermal management. The systems and methods discussed herein are adaptable and thus sensitive to the large array of driving scenarios encountered in the real-world and the relative frequency of such scenarios.

The preview nature of the additional information, e.g., the status of a traffic signal before vehicles reach an intersection; traffic, weather, and accident information, enables the design of the propulsion system controller to plan ahead in order to (i) optimize total vehicle energy usage, (ii) cascade anticipated speed and torque request to lower-level controllers and actuators, and (iii) execute the most efficient propulsion system operations.

Motor vehicles may include different levels of autonomy, ranging from fully manual driving modes to fully autonomous modes with little driver interaction. In full manual examples, the control strategies may interact with driver inputs and expectations of vehicle responses. Therefore one aspect of the present disclosure is utilizing opportunities to preempt certain driver inputs in such a way that is transparent to the driver, yet yields the benefit of optimizing one or more operating parameters of the propulsion system.

The various propulsion system components discussed herein may have one or more associated controllers to control and monitor operation. Referring to FIG. 1, a vehicle propulsion control system 10 includes a controller 12 to manage propulsion of vehicle 11. Controller 12, although schematically depicted as a single controller, may be implemented as one controller, or as system of controllers in cooperation to collectively manage the propulsion system. Communication between multiple controllers, and communication between controllers, actuators and/or sensors may be accomplished using a direct wired link, a networked communications bus link, a wireless link, a serial peripheral interface bus or any another suitable communications link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. In a specific example, multiple controllers communicate with one another via a serial bus (e.g., Controller Area Network (CAN)) or via discrete conductors. The controller 12 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 12 may also store a number of algorithms or computer executable instructions needed to issue commands to perform actions according to the present disclosure.

The controller 12 is programmed to monitor and coordinate operation of the various propulsion system components. The controller 12 is in communication with an engine and receives signals 20 indicative of engine at least rotational speed (RPM), temperature, pressure, and exhaust composition. The controller may also receive other signals pertaining to the state of the engine and its operating conditions. In the case of a hybrid propulsion system having both an engine and an electric machine as propulsion sources, the controller 12 is also in communication with the traction electric machine and receives signals 22 indicative of motor speed, torque, temperature, current draw, and voltage across the motor. The controller 12 also receives signal 14 indicative of a user selection of any of various propulsion system operation modes. The controller 12 is communication with one or more sensors at driver input pedals to receive signals indicative of pedal position which may reflect both positive and negative acceleration demand provided by the driver. The driver input pedals sensors may output accelerator pedal signal 16 and a brake pedal signal 18. In certain alternative examples, such as a self-driving autonomous vehicle, acceleration demand may be determined by a computer that is either on-board or off-board of the vehicle 11 without driver interaction. The controller also receives signals 24 indicative of accessory loads which may be driven by propulsion system output, vehicle speed signal 26, and road load signal 28 indicating torque output at the vehicle wheels.

The controller also receives a number of signals from onboard signals, such as radar signals 30, lidar signals 32, and camera signals 34. As discussed in more detail below, the onboard sensors may be used to sense the environment around the vehicle 11 and inform decisions regarding propulsion system operation.

The controller further receives data signals from external sources. Signal 36 from infrastructure traffic devices indicates current and upcoming states of such devices. Signal 38 from nearby vehicles 50 may include information such location, speed, and route information of other vehicles. A GPS signal 40 provides the location of the host vehicle 11. The controller 12 may further be in communication with a cellular network 54 or satellite to obtain a global positioning system (GPS) location. Road grade signal 42, traffic data signal 44, and weather data signal 46 each may be received at the vehicle 11 and include information about the upcoming route of the host vehicle.

Based on the various input signals received by the controller, a processor is programmed to execute one or more algorithms to control operation of the propulsion system. An operating system is stored at the controller 12 to monitor and regulate operation of the components of the propulsion system. The operating system may include a traffic mode calculation algorithm 58 to determine external traffic conditions and implement optimal engine operation based on the forecasted conditions. Algorithm 60 uses vehicle dynamics to calculate required torque at the vehicle wheels, or road load, based on the external conditions. Algorithm 62 may be employed to automatically determine when the host vehicle 11 is stopped at an intersection. Algorithm 64 may be used to select a predetermined speed profile based on the forecasted driving events. Algorithm 66 automatically detects high traffic congestion creep conditions and adjusts engine operation to optimize for the low-speed stop and go driving. Algorithm 68 includes a number of different shift schedules for the transmission gear ratio, and shifting may be adjusted based on the forecast driving conditions. Algorithm 69 includes vehicle parameter adaptation calculations to determine adjustments for key vehicle parameters such as weight and tire friction to implement optimal powertrain operation. Algorithm 70 includes logic to selectively deactivate any of the combustion cylinders of the engine when low torque output is required. Algorithms 58, 60, 62, 64, 66, 68, 69, and 70 are each described above as independent features. However, it should be appreciated that certain aspects of the features include functional overlap and therefore may be combined into more comprehensive overarching algorithms.

With continued reference to FIG. 1, the controller 12 provides several output signals to influence the operation of the propulsion system and other component which influence vehicle dynamics. The controller 12 may control engine operation by control signal 72 which regulates fuel volume flow to the engine, control signal 74 to control airflow though the throttle, a control signal 76 to control engine cylinder deactivation, as well as control signal 78 which triggers engine start and restart. In the case of a hybrid propulsion system, the controller outputs control signal 80 to regulate the amount of current provided to the traction electric machine. The controller also provides signals to influence transmission operation such as a torque converter clutch control signal 82, and a gear ratio shifting actuator control signal 84. The controller also may regulate friction brakes with control signal 86 to manage vehicle deceleration.

An optimized propulsion system control strategy may be used in connected vehicles having a combustion engine to apply any of multiple driving profiles. Depending on the desired objective, any of several different fuel consumption modes may be implemented affect operation of the propulsion system. For example, an "eco" mode may be configured to minimize fuel consumption. The eco mode is discussed by way of example in the present disclosure, however different fuel consumption modes may be selectively employed to achieve and of a number of objectives. A performance mode may be configured to maximize propulsion system output and/or driving dynamics. According to additional examples, modes may be configured to optimize traffic flow and minimize stops across a population of vehicles nearby the host vehicle 11. Optimized control for CAV propulsion systems according to the present disclosure supports various fuel economy optimization strategies to maximize fuel economy during frequently used real-world vehicle maneuvers.

Sub-strategies such as an eco-approach, eco-departure and/or speed harmonization strategies may be employed under certain driving scenarios or maneuvers. Such strategies are effective to more fully utilize available data to achieve better real-world fuel efficiency. Several different control features can be further coordinated to improve fuel economy. For example, any combination of deceleration fuel cutoff (DFCO), engine stop-start, modified transmission shift schedule, limitation of acceleration torque request, and cylinder deactivation can be applied to further the objective of fuel consumption optimization preempting a driver torque request. According to certain examples a speed profile may be selected to fine tune fuel consumption during at least deceleration approaching a known stop, departing from a stop where upcoming traffic conditions are known, and various other typical traffic flow conditions.

The controller may store one or more algorithms to receive signals indicative of traffic data as well as signals from onboard sensors in order to predict upcoming traffic events. Consolidation of data from nearby devices using vehicle-to-infrastructure (V2I) communications, data from other vehicles 50 using vehicle-to-vehicle (V2V) communications, as well as data from external servers 56 using wireless communications (e.g., traffic flow data) is consolidated to generate a forecasted distance from a given vehicle location to an upcoming stopping location.

The controller may be programmed to determine optimal engine torque after an upcoming stop is predicted, then apply a predetermined profile to influence vehicle deceleration. The controller may also be programmed to determine an optimal engine coast down approaching an upcoming stop. The controller may be further programmed to use data indicative of upcoming traffic conditions to determine an optimal acceleration strategy departing a stop based. The controller may be further programmed to adapt any of various velocity profiles based on learned vehicle weight and road grade information. The controller may be further still programmed to modify any of various velocity profiles to harmonize vehicle speed with other nearby vehicles based on traffic flow conditions.

During a conventional approach to a vehicle stop, all of the kinetic energy of the vehicle could be wasted through the brake system, which not only results in suboptimal fuel efficiency of the vehicle but also wear of the brake system as well. According to at least one example, preview information received via vehicle connectivity is used to minimize lost energy by forecasting a stopping event as early as possible, then coordinating vehicle and powertrain control systems to reduce energy consumption. Forecasting the stopping event as early as possible minimizes the fuel consumption by allowing the vehicle to run at most efficient powertrain operating modes and maximize the recovery of potential energy through coasting. Data from onboard sensors (e.g., radars, lidars, cameras), infrastructure devices (e.g., signalized traffic lights, traffic flow monitoring systems), as well as other vehicles are aggregated to provide the prediction of the vehicle stop.

Once a stopping event is forecasted, the propulsion system control will converge towards an optimal vehicle speed profile to support management of engine functions. Specifically, the approach of a stop can be broken down into two segments of operation. During the first segment of operation, positive torque might still be required from the powertrain since the vehicle is too far away to coast to the stopping location. In this segment, the proposed strategy is to operate the vehicle near the most fuel-efficient operating condition considering the permissible speed limit regulations (upper and lower) as well as traffic flow. This also includes optimizing a cylinder deactivation function for the combustion engine. At the same time, a model-based controller algorithm continues to forecast the propulsion system torque demand from the current vehicle position until the stopping location. Once positive engine torque is no longer required (i.e., the vehicle has enough kinetic energy to coast to stop at the stopping location), the fuel is shut off immediately (i.e., aggressive DFCO) and the vehicle is allowed to coast to a stop during the second segment of operation. Under many existing DFCO strategies without forecast information, the engine is refueled after vehicle and/or engine speed drops below a calibrated threshold. Using the forecasted stop information according to the present disclosure, refueling can be bypassed altogether, thus using substantially no fuel at all during the entire stopping process.

Additional fuel-saving features may also be employed during eco-approach. For example, to maximize the utilization of vehicle kinetic energy, the transmission can be placed into neutral to remove the "engine braking" effect during coasting. Removal of the engine braking effect allows for longer coasting distances, thus maximizing fuel savings when stop is sufficiently forecasted. The forecasting algorithm also takes into consideration the road grade ahead since the ability to coast may be heavily influenced by the road grade. The torque forecasting algorithm includes a portion to determine the optimal timing to implement coasting. It should be appreciated that under certain conditions, it may be desirable to maintain engine braking to minimize mechanical braking (e.g., when a traffic stopping event is forecasted too late for an extended coast).

Figure 2:
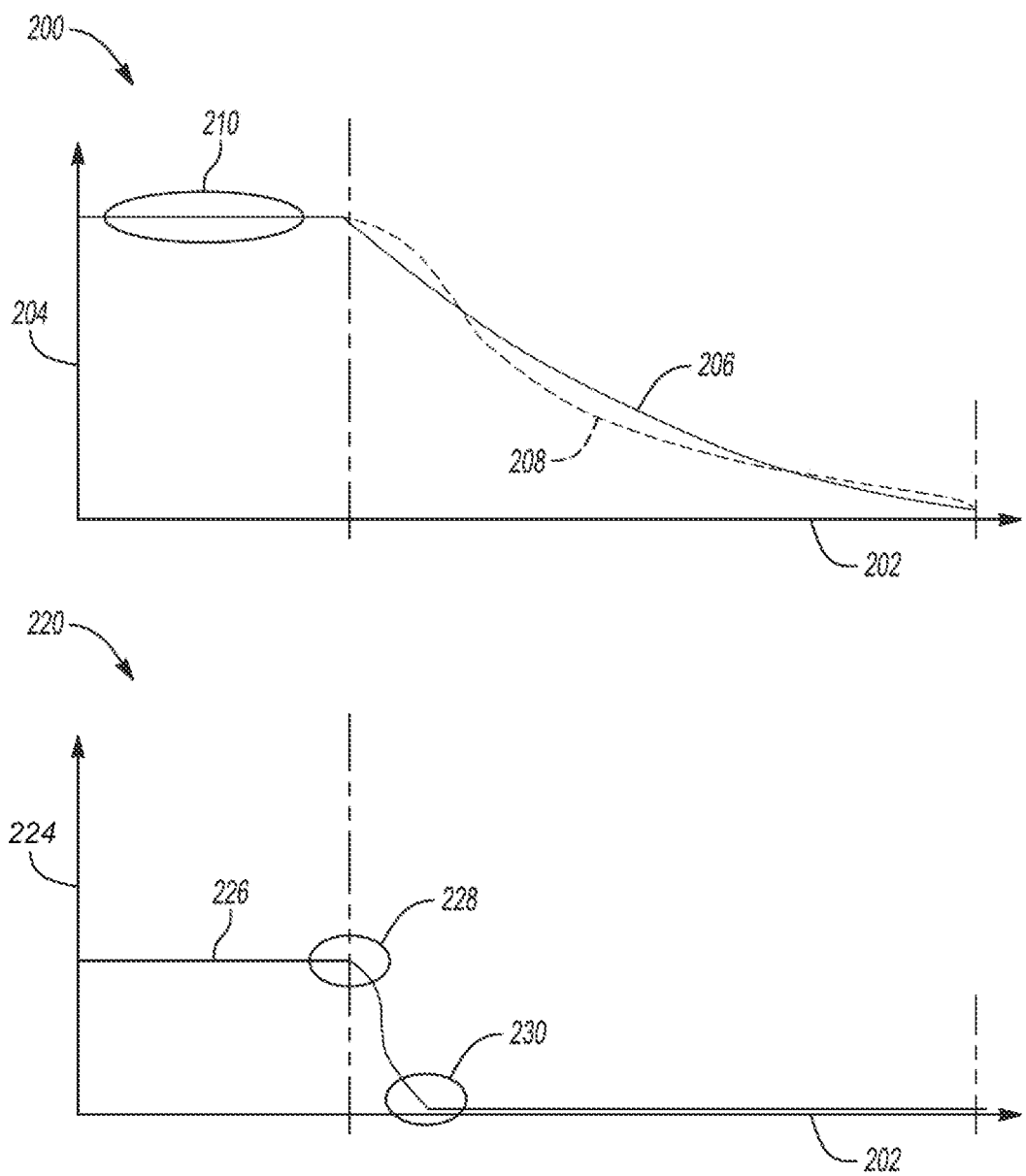
FIG. 2 is a plot of a vehicle deceleration event.

Referring to FIG. 2, a graphical representation of an example traffic stopping event is depicted. Plot 200 represents an example velocity profile and plot 220 represents a corresponding engine speed profile during the same event. Horizontal axis 202 represents travel distance along the stopping event and vertical axis 204 represents vehicle velocity. Curve 206 represents a predetermined target velocity profile, and curve 208 represents an actual velocity profile during deceleration. Vertical axis 224 of plot 220 represents engine speed. Curve 226 is a desired engine speed profile during the stopping event.

At about location 210 of plot 200, an upcoming stopping event is detected as discussed above. The controller may recognize an opportunity to engage in an eco-approach towards the vehicle stop location. When a stop is predicted but positive engine torque is still required (e.g., the stop location is too far away to coast), vehicle speed can be optimized to maximize engine efficiency by operating near a "sweet spot" operating condition. The controller may calculate a distance D1 from the stop location to apply a desired deceleration profile. At distances closer than D1 to the stop location, engine torque may no longer be required. An enhanced engine fuel cutoff and shutdown strategy can be applied once engine torque is no longer required. At location 228 of plot 220, fuel is cutoff from the engine at distance D1, and the speed of the engine begins to decrease. Once the speed of the engine is substantially zero at location 230, fuel-less coast down may occur during the stopping event. Based on certain variable inputs, such as road conditions and driver inputs, actual deceleration according to curve 208 may vary from the desired approaching velocity profile 206. The controller may be programmed to correct friction braking and/or engine braking to maintain a convergence to the ideal deceleration velocity profile. This approach fully utilizes vehicle momentum and concurrently minimizes braking usage.

Figure 3:
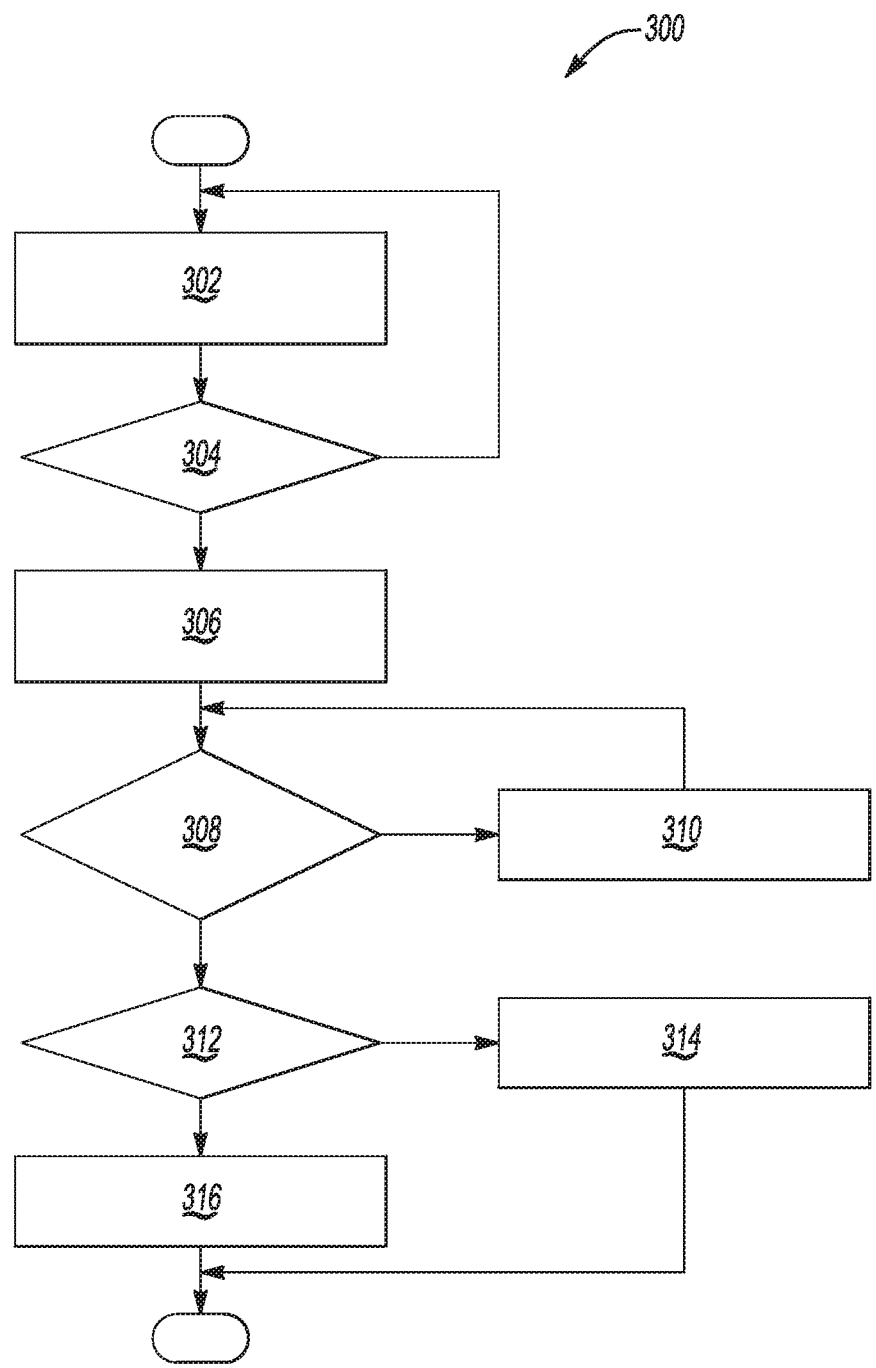
FIG. 3 is a flow chart of a control algorithm of a vehicle deceleration event.

Referring to FIG. 3, a method 300 is an example control logic of an algorithm to perform an eco-approach to a stop location. At step 302 the controller assesses which of the plurality of available fuel consumption modes is in effect to govern engine operation. As described above, "eco" modes are discussed herein by way of example, but any of a number of different functional objectives may be used to influence engine operation. The algorithm determines at step 304 whether an upcoming stopping condition is forecast. If no stop is forecast at step 304, the algorithm may cause the controller to return the beginning of the method and continue to monitor for the existence of a vehicle stop forecast.

At step 306 the algorithm selects an optimal deceleration profile to approach the stop condition based on the particular fuel consumption mode in effect. The particular profile chosen influences the distance from stop at which the algorithm engages the optimized approach portion of the method. The deceleration profile may include a predetermination of at least one of an ideal velocity profile and an ideal engine torque profile.

The algorithm determines at step 308 whether the desired vehicle velocity still requires positive torque to propel the vehicle. As discussed above, an optimal deceleration profile may include steady propulsion near an initial portion until the vehicle approached a desirable distance from the stop point. If positive torque is still required at step 308, the algorithm causes the engine to operate according to a normal speed demand at step 310, then continue to monitor until positive engine torque is no longer required.

If propulsion torque is no longer required from the engine at step 308, the algorithm determines at step 312 whether the magnitude of deceleration desired according to the predetermined velocity profile is sufficient to warrant engine braking to assist in slowing the vehicle. If engine braking is warranted at step 312, the algorithm causes at step 314 the engine to remain in drive gear to maintain resistive drag due to the rotation of the driveline causing the engine to turn. At the same time the algorithm may cause fuel supply to the engine to be cut off to preserve fuel during the deceleration event.

If the predetermined velocity profile is such that engine braking is not desired at step 312, the algorithm may cause the engine to shift to a neutral gear at step 316 to remove torque resistance of the engine allowing the propulsion system to coast to a stop.

According to another vehicle operation example using energy consumption reduction strategies is adjusting engine operation when accelerating away from a stop. In the case of departing from rest, heavy acceleration consumes a greater volume of fuel leading to degraded fuel economy. According to aspects of the present disclosure, automatically controlling vehicle speed commensurate with the traffic conditions may improve fuel economy without adversely affecting driver performance expectations. A less than aggressive predetermined acceleration speed profile can be used in heavy traffic without negative consequences where an upcoming stopping condition is forecast. However, similar to the approach case discussed above, optimizing vehicle speed alone may not yield the full fuel-saving benefits achievable with connectivity information. In particular, well-coordinated propulsion system control strategies may be used to further contribute to increased energy savings such as: 1) a more rapid upshift schedule applied to the transmission (including skipping some lower gear ratios), 2) earlier lockup of torque converter, and 3) launching the vehicle in higher gears.

For vehicle departure from a stop, the controller may store one or more algorithms to intelligently select and execute a blend of strategies using the data acquired through vehicle connectivity. A possible control architecture in this case is one where the traffic condition is first assessed by a fusion of the various sources of connectivity information. According to one example, the traffic condition can be assessed as a numerical value between 0 and 1, where 0 corresponds to no traffic and 1 corresponds to heavy traffic. The heavy traffic condition may imply a particular likelihood of an imminent stop or significant deceleration. An imminent stop or slowdown condition may also be directly sensed based on the speed behavior of one or more preceding vehicles. The traffic assessment may be used by the controller to apply acceleration control according to a predetermined speed profile based on the forecasting of an upcoming driving event. And, the controller selects the best engine operating strategy to complement the desired speed trajectory. In a specific use case, once a stop-and-go cyclic traffic condition is detected, vehicle acceleration may be limited in the "go" portions of the cycle based on conserving fuel without adversely affecting driver expectations.

In some examples control algorithms may apply to the operation of a single vehicle in isolation as well as to the operation of the same vehicle in a group of collaborating vehicles. One example of speed harmonization of vehicles avoids undulations in the traffic flow, through use of connectivity and/or predictive information regarding the travel path and road conditions. According to aspects of the present disclosure, extensions of this basic application can be exploited through an integrated propulsion system control scheme that includes the use of the connectivity information to advance or delay particular powertrain mode changes. For example, predicted vehicle driving events may be used to influence operation of the propulsion system to optimize for any of a number of performance attributes. For a given temporal or conditional vehicle event horizon, connectivity information can be aggregated and used in a coordinated manner allowing powertrain controls to engage or disengage cylinder deactivation, manage engine accessory loads in a more efficient manner, more aggressively apply DFCO, change transmission shifting strategies, and select optimal engine operating points. This information enabled and coordinated operating points and modes of powertrain control may be optimized for a given vehicle dynamics state rather than reactive to a generally unpredictable torque demand conveyed to the powertrain in real-time.

In the case of a forecasted congested traffic condition, a homogeneous speed may be broadcast such that a collection of vehicles converges to the single speed to reduce undulations in traffic flow. According to the systems and methods of the present disclosure, the engine controller may be configured to apply a predetermined speed profile to adjust from the current speed to the homogenous speed such that fuel consumption waste is minimized during the transition. In one example, the vehicle speed profile is limited so as not to overshoot the homogenous speed in the time prior to the application of the homogeneous speed. Additionally, if the current speed is greater than the homogeneous speed, aggressive coast-down features may be employed to manage energy during the transition.

In further examples, an engine stop-start feature may be configured to deactivate the engine as opposed to idling while the vehicle is stopped to conserve fuel. The strategy may include limiting engine deactivation to only those situations where the fuel saved over the time which the engine is deactivated exceeds the fuel consumed by an engine restart. The controller may be programmed to deactivate the engine at a stop only when it is forecast that the vehicle will be stopped for a duration of time greater than a predetermined time threshold. In one example, an engine consumes a volume of fuel during a restart equal to about an amount consumed during 10 seconds of engine idling. Thus, the controller may be programmed to only cutoff the engine at a stop when it is forecast that the vehicle will be stopped for longer than 10 seconds. While an example duration is provided by way of example, it should be appreciated that the value crossover threshold may vary from vehicle to vehicle, as well as vary under different operating conditions of a single host vehicle. The controller may include one or more algorithms to determine a time threshold based on the current operating conditions to determine whether or not to cutoff the engine while the vehicle is stopped. For example, at least factors such as external temperature, historical fuel consumption data, and accessory power loads may influence the crossover time duration at which an engine cutoff saves fuel. The controller may store a lookup table to determine a fuel consumption at idle rate based on the current conditions.

Figure 4:
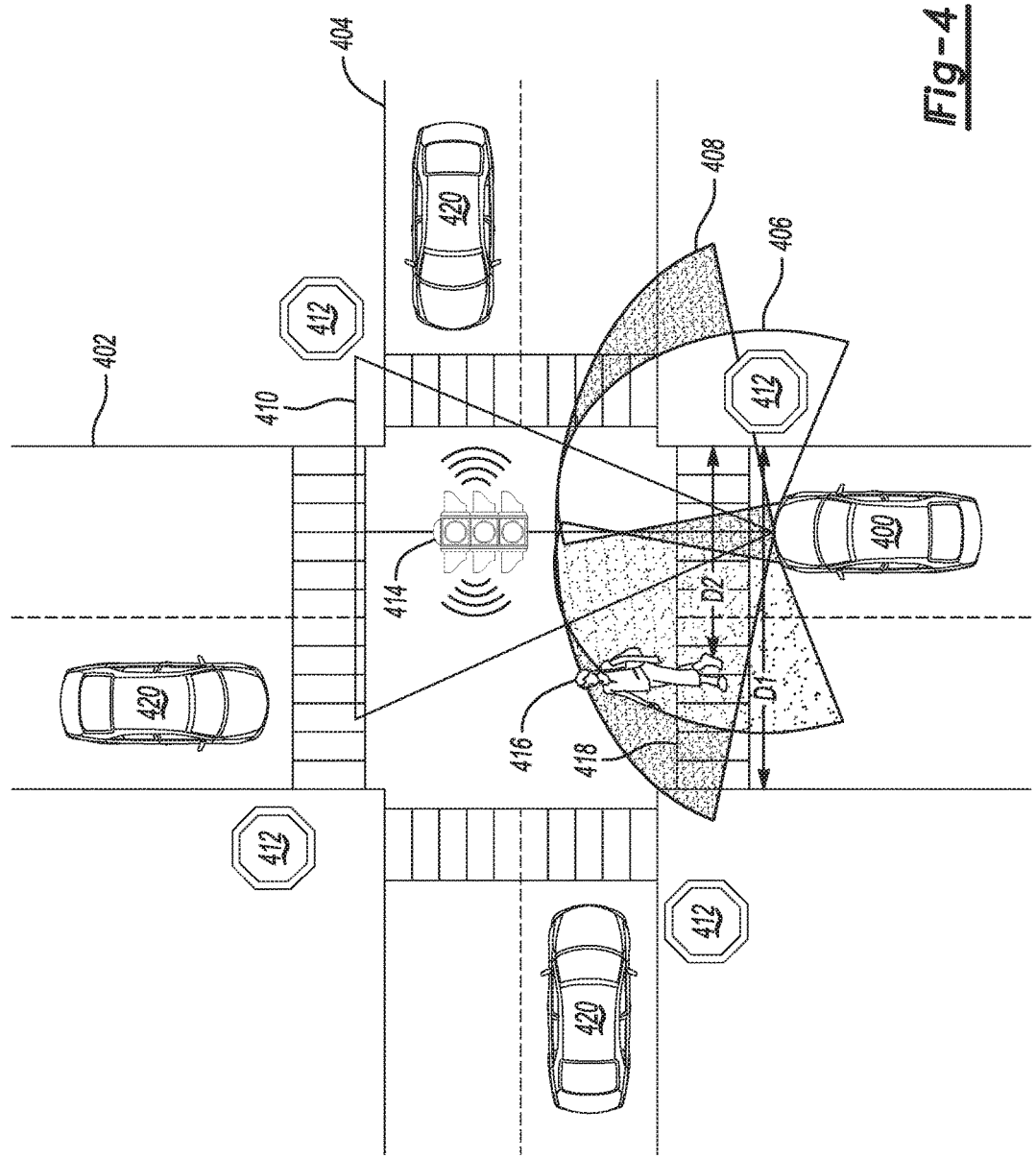
FIG. 4 is a diagram of a host vehicle at an intersection condition.

With reference to FIG. 4, the engine of a host vehicle 400 may be controlled at road intersections based on data received through vehicle connectivity as well as onboard sensors. The host vehicle 400 may approach an intersection of a first road 402 and a second road 404. The host vehicle 400 is equipped with a plurality of sensors configured to output signals indicative of objects within a vicinity of the vehicle. A sensing range 406 may correspond to one or more short range radar (SRR) sensors. A sensing range 408 may correspond to one or more wide field-of-view optical cameras. A sensing range 410 may correspond to one or more LIDAR sensors and/or long range radar (LRR). Output signals from the sensors are provided to the controller as inputs to one or more engine control algorithms. Data from the various sensors may be fused by the controller then used to detect a presence of objects in a vicinity of the host vehicle. Further, portions of the control algorithm may include object recognition such that the controller may make a determination of particular types of objects detected by one or more of the sensors.

The presence of an intersection may prompt the host vehicle 400 to come to a stop. Detection of intersection conditions may be used to inform the engine controller of the driver's upcoming intent regarding propulsion of the vehicle. The controller may determine when the driver will seek to depart from the stopped condition. For example traffic signs 412 within the field of view of one or more cameras may be optically recognized using object recognition algorithms. In one example, the traffic sign 412 may be a stop sign indicating to the engine controller that the vehicle will come to a temporary stop. For a traffic sign such as a stop sign, the controller may store an assigned scalar time value to assume the vehicle will be stopped for a fixed duration of time. Depending on the operating conditions and other factors the set time value assigned to a stop sign may or may not be sufficient to warrant deactivating the engine.

The vehicle may also communicate with infrastructure traffic devices using wireless communication. In one example, a traffic light 414 broadcasts a signal indicative of the state of the light indicators and the remaining duration in the current state. The vehicle controller may use this signal as an input to determine whether the remaining duration of time the vehicle will be stopped is sufficient to warrant deactivating the engine for fuel savings. In other examples, a railroad crossing signal may be configured to actively broadcast the presence a of a train crossing the intersection, and send one or more signals indicative of the remaining duration of time for which the train will be crossing the intersection.

In a further example, the various object detection sensors may be used to detect a moving object in the vicinity of the host vehicle 400. In the example of FIG. 4, a pedestrian 416 may be detected as a moving object while traversing a crosswalk 418 of street 402. Based upon the total distance D1 of the total crosswalk length, the distance D2 traversed by the pedestrian 416, and the rate of travel, the controller may determine a remaining duration of time for which the pedestrian will be in the crosswalk 418. In other examples the controller may determine an upcoming duration of time for which a moving object will be in a vicinity of the host vehicle. The use of rate of movement to determine stopping duration may be useful for engine cutoff for pedestrians, but also for cyclists, other vehicles 420, crossing animals, and the like.

Figure 5:
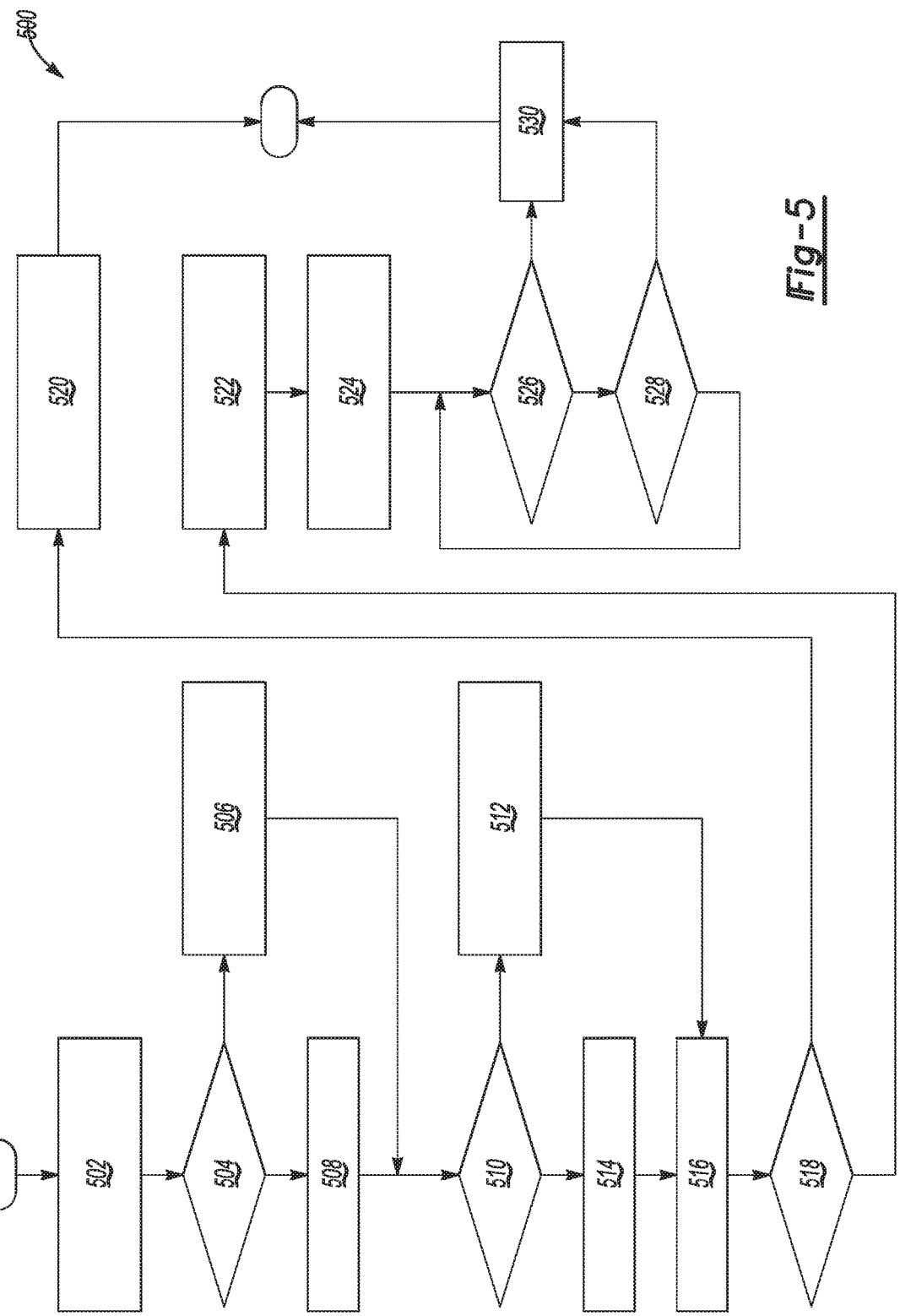
FIG. 5 is a flowchart of a control algorithm of a vehicle departure from a stopped condition.

Referring to FIG. 5 method 500 is an example algorithm logic to determine whether or not to employ the engine stop-start function at a stop using the connectivity data combined with onboard sensor data. At step 502 the algorithm determines when the vehicle has come to a stop. In one example the controller monitors a speed sensor for a stable value reflecting substantially zero speed.

At step 504 the controller determines whether a traffic device has been detected. As discussed above, this may be performed using onboard detection sensors. In certain examples this may further include recognition of a particular type of traffic sign, such as a stop sign as compared to a yield sign or other traffic sign which does not require a stop. Detection of a traffic device may also include wireless V2I communication with nearby devices such as a traffic light. In further examples, the location of traffic devices may be broadcast from an external server using map data and compared to the current GPS location of the host vehicle.

If a traffic device is detected at step 504, the algorithm includes calculating at step 506 a duration of time T1 associated with the detected traffic signal. In one example a predetermined set value is used for T1 based on an assumed duration of the vehicle stop. In examples where the controller receives data transmitted from infrastructure devices, external servers, or other sources the data may include an indication of the duration of time for which the traffic device will prompt the vehicle to remain stopped. The controller may use the received data to set a value for the duration of time T1.

If no traffic device is detected at step 504, the algorithm may store a zero value for the duration of time T1, indicating that the there is no stop time required due to a traffic device.

At step 510 the algorithm includes determining whether there is a moving object passing in the vicinity of the host vehicle. The controller may rely on data output from any of a number of object detection sensors provided onboard the vehicle. In other examples the controller may receive signals transmitted from the moving object itself. For example, a nearby vehicle may broadcast its presence using V2V wireless commination. Additionally a mobile device carried by a pedestrian may similarly broadcast its presence to the host vehicle using V2P (vehicle-to-pedestrian) wireless communication.

At step 512 the algorithm includes calculating a duration of time T2 associated with the time for the detected moving object to pass allowing the host vehicle to depart. The rate of motion of the object is used to calculate the remaining time for the object to cross the intersection. In other examples, the duration assumed to remain stopped is based on the time required for the moving object to pass from the vicinity of the vehicle. Thus duration of time T2 is based on the time that the moving object will remain within the vicinity while the vehicle is stopped. The algorithm may also include a geometric pedestrian zone which is used to calculate an expected duration of stop time to allow a moving object to clear the anticipated path of the host vehicle.

If no moving object is detected at step 510, the algorithm may store a zero value for the duration of time T2, indicating that the there is no stop time required due to a moving object passing before the host vehicle.

At step 516 the algorithm may reconcile multiple causes of a vehicle stop at an intersection. An assumed overall duration of time stopped $T_{stop}$ is determined as the maximum of duration T1 and duration T2. That is, the longer stop time requirement of any of the multiple stopping causes may override shorter stop time durations.

At step 518 the overall duration of time stopped $T_{stop}$ is compared to a time threshold T3 to assess whether the fuel saved from engine deactivation warrants expending the fuel required for a restart following the engine shutdown. Time threshold T3 may vary dynamically and be calculated by the controller on a case-by-case basis. In one example the controller stores a set of lookup tables which take into account present vehicle operating conditions which affect engine idle fuel consumption.

If the expected duration of the stop $T_{stop}$ is less than the time threshold T3, the algorithm maintains the engine in an on state at step 520 and ends algorithm 500 for the current stop event. If sufficient stopping duration is expected at step 518 (i.e., $T_{stop}$>T3), the algorithm causes the engine to shut off at step 522.

Once the engine is shutoff, the algorithm may cause a counter to begin at step 524 to monitor the duration of the stopping event. At step 526 the algorithm monitors for a driver release of the brake pedal which may indicate a driver intention to move the vehicle and depart from the stopped condition. If at step 526 the driver has released the brake, the algorithm causes the engine to restart at step 530.

If at step 526 the driver has maintained the brake, the algorithm monitors the current time T since beginning the counter to monitor for the end of the expected duration of the stop $T_{stop}$. Once the expected time has expired, the algorithm could cause the engine to restart at step 530 to prepare for departure from the stop and avoid any latency in propulsion system torque output.

In alternate examples, the controller may rely on sensor data to continuously monitor the movement of the object in the vicinity of the vehicle, and in response to the object leaving the vicinity sooner than expected, automatically restart the engine in preparation for a departure. For example if a pedestrian increases their rate of movement partially across a crosswalk, the vehicle may be able to depart earlier than forecast.

In a further example, the engine controller may be programmed to apply a speed profile which is based on a setting a particular distance from one or more preceding vehicles. The controller may rely on direct sensing of nearby vehicles using onboard sensors as discussed above. Additionally the controller may rely on data transmitted from one or more preceding vehicles to serve as creep speed guidance.

During extreme traffic congestion where vehicles are prone to frequent stops and creep speeds, it may be advantageous to arrange a predetermined velocity profile to limit vehicle acceleration based on movement of at least one preceding vehicle. For example if the movement of one or more vehicles located is known or forecast to be a creep traffic condition, the engine would consume unnecessary fuel during aggressive vehicle acceleration only to imminently stop. Thus limiting the allowed maximum acceleration under such conditions can be implemented, combined with other engine management features discussed herein. For example, the controller may be programmed to reduce supply power to, or deactivate, certain accessory loads that operate using engine torque while the vehicle is stopped. Additionally, engine output torque may be limited during creep to conserve power during the low speed operation. Further, torque converter clutch lockup may be used to provide efficient transfer of the engine output torque with reduced or eliminated slip. Further still, the controller may cause the transmission to operate in higher gear ratios to improve fuel efficiency under creep conditions without adversely affecting driver perception. An additional feature may combine eco approach strategies as discussed above to coast to provide coasting with DFCO to decelerate while at low speeds.

Figure 6:
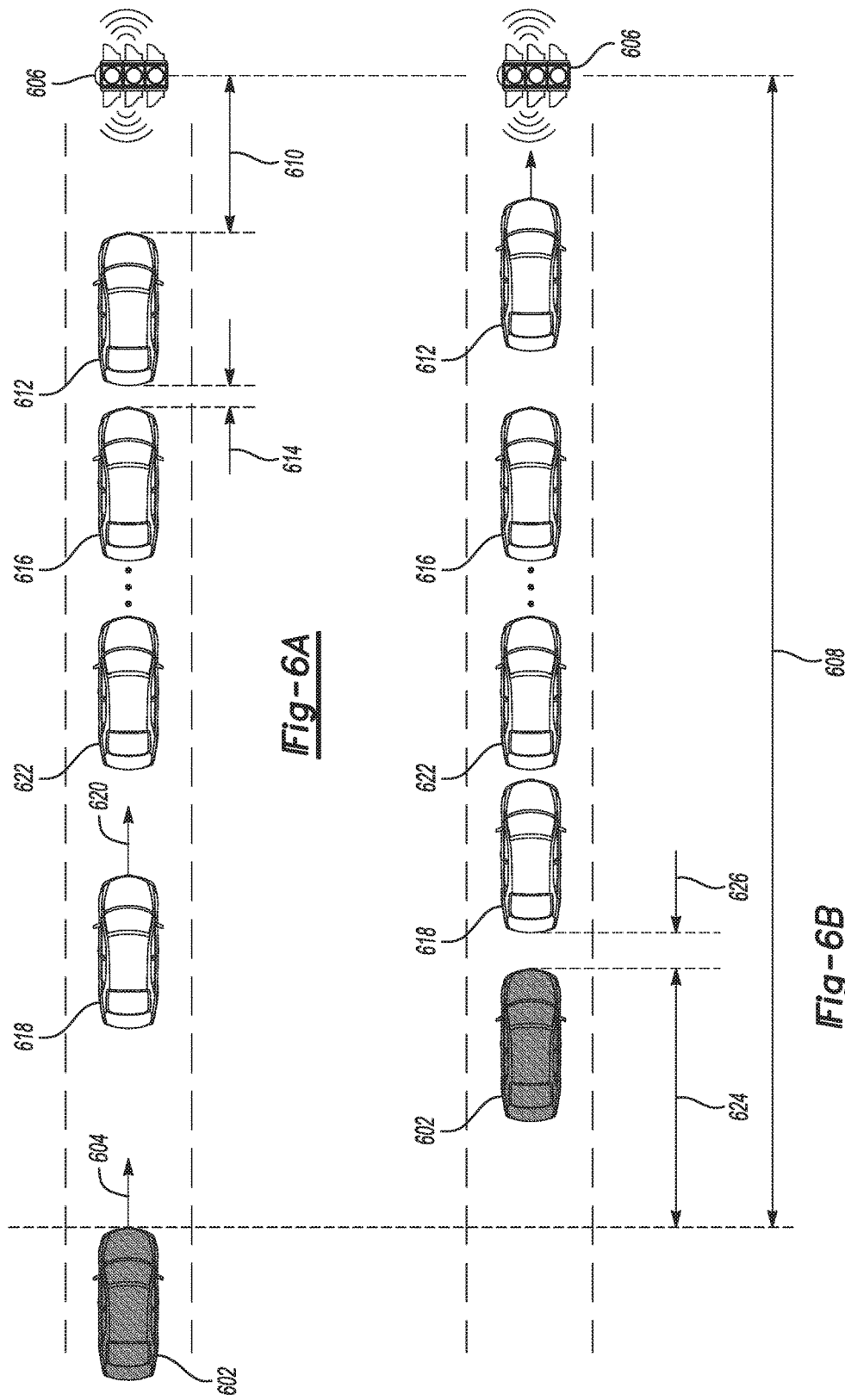
FIG. 6A is a schematic view of a host vehicle prior to arrival at a stop location.
FIG. 6B is a schematic view of a host vehicle prior to departure from a stop location.

Referring to FIG. 6A and FIG. 6B, there may be occurrences where one or more intervening vehicles are located between a current position of a host vehicle to cause the host vehicle to stop. As discussed above, information received at the host vehicle may allow the controller to determine a total amount of time at a stopped condition while taking into account a stop time for each of a number of intervening vehicles. FIG. 6A represents a vehicle approaching a stop condition caused by a traffic signal, and FIG. 6B represents the host vehicle in a stopped condition trailing a sequence of intervening vehicles in line at the traffic signal. A host vehicle 602 initially advances forward in a direction according to arrow 604. A wireless signal may be broadcast from the traffic signal 606 indicating a traffic light state. In one example the traffic light state may indicate a present red traffic signal or a time until the next light state (e.g., an imminent red traffic signal).

The vehicle controller is programmed to determine the total distance 608 from the host vehicle to the intersection based on the position of the traffic signal 606. The position of the traffic signal 606 may be broadcast directly and included in messages transmitted to the host vehicle. For example, the traffic signal may broadcast a message indicative of its GPS location. In another example the controller makes an estimate of the distance 608 based on the received signal strength indicator (RSSI), or a measurement of the power present in the signal received from the traffic signal 606.

The vehicle controller is also programmed to determine a spacing between each of the intervening reference vehicles stopped at the traffic signal. Several intervening spacing gaps may be added to determine a final stop location of the host vehicle. A first spacing 610 from the first stopped reference vehicle 612, RV_1, may be determined from an actual vehicle transmission or estimated from an assumed spacing from the traffic signal 606. Similarly, the vehicle controller may determine one or more gaps between two subsequent reference vehicles. In the example of FIG. 6A, gap 614 is between the first stopped reference vehicle 612, RV_1, and the second stopped reference vehicle 616, RV_2. Each of the reference vehicle positions may be determined by direct messages including the position, or by using RSSI as discussed above. The controller may accrue the relative gaps and locations of all of the reference vehicles. Based on the expected position of the last of a series of stopped reference vehicles, the controller calculates an expected distance to stop.

Time delay can occur between the time when a first vehicle in a series of vehicles comes to a stop and the time when the last vehicle of the series comes to a full stop. Aspects of the present disclosure include forecasting latency and maximizing the engine-off duration to account for time when one or more intervening reference vehicles has not come to a full stop. In one example, the controller estimates a stopped position of the last reference vehicle 618, RV_N, prior to the reference vehicle coming to a complete stop. With reference to FIG. 6A, the last reference vehicle 618, RV_N, decelerates as it approaches the intersection moving along a path indicated by arrow 620. Based on any number of reference signals, the controller predicts an upcoming stop location of the last reference vehicle 618, RV_N. In one example the controller bases the estimate on the stopped location of the preceding next-to-last reference vehicle 622, RV_N−1. In other examples the controller may base the estimate on the trajectory and/or deceleration rate of the next-to-last reference vehicle 622, RV_N−1, and/or the last reference vehicle 618, RV_N.

There also may be latency related to the departure of the host vehicle 602 from the stopped condition. Once the traffic signal 606 changes to a green state, there may be a delay between the occurrence of the clear path and the actual movement of the first stopped reference vehicle 612, RV_1. Similarly, each subsequent vehicle in the series may undergo its own respective delay prior to its actual movement following the occurrence of a clear path. According to aspects of the present disclosure, the vehicle controller is programmed to account for respective delays in departure for each of a number of intervening reference vehicles in the estimation of the time of a clear path for the host vehicle.

As discussed above, the controller may deactivate the engine over the longest time possible to reduce fuel consumption. Thus the controller is programmed to estimate the total time over which no acceleration from the host vehicle is required. This may include the duration of deceleration over the distance 624, the duration of time over which the host vehicle 602 remains at the stopped condition, in addition to any further delays related to latency of departure.

Figure 7:
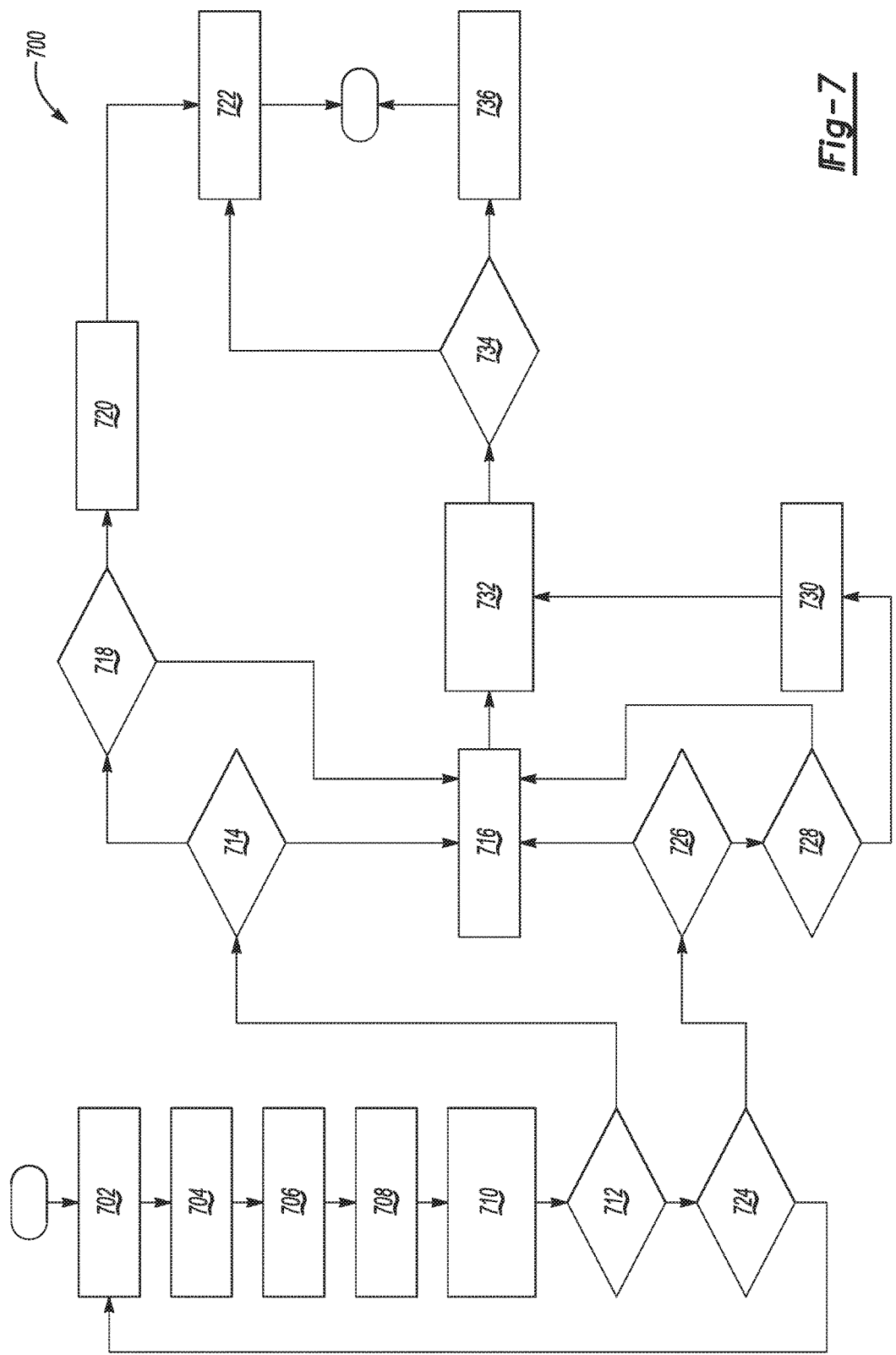
FIG. 7 is a flowchart of a method of reducing engine output.

Referring to FIG. 7, method 700 represents an algorithm which includes determining whether or not to deactivate the engine while taking into account total duration prior to a clear path for a host vehicle departure. At step 702 the algorithm includes receiving a broadcast from an infrastructure device that may indicate an existing clear path, or the time until the next clear path. As discussed above, one example includes a traffic signal which may transmit messages including information regarding a present of future state of the traffic signal. In a more specific example, a host vehicle may receive a SPAT (Signal Phase and Timing) message from a traffic signal at step 702. The SPAT message describes the signal state of the intersection and how long this state will persist for each approach and lane that is active. In some examples, allowed movements may be given to specific lanes and approaches by use of the lane numbers present in the message. In further examples, the host vehicle also receives map location information transmitted from the traffic signal at step 702.

The algorithm includes determining the present signal state at step 704, and determining the time until the next signal state at step 706, where each determination may be based on the SPAT message transmitted to the host vehicle. At 708, step the algorithm includes generating an estimate of the total distance from the host vehicle to the intersection based on the position of the traffic signal. As discussed above RSSI estimation may be used at the host vehicle controller to determine the distance to the intersection.

At step 710 the algorithm includes performing one or more transformations of reference vehicle GPS coordinates into coordinate systems which are relative to a heading direction angle of the host vehicle. Discussed in more detail below, the transformation may be performed to improve short range accuracy and/or simplify calculations thereby reducing processing burdens. Further explained below, the vehicle controller may be programmed to perform data discrimination tasks whereby location and trajectory data received from a plurality of nearby vehicles is narrowed down to include only those specific vehicles that are expected to affect an upcoming stop position and/or duration of the host vehicle. As used herein, trajectory refers to the curve describing the path of movement of a moving object. A heading direction of given object may change along a trajectory path. In some cases a trajectory may be extrapolated to provide information regarding future motion of a given object.

At step 712, if the current traffic signal state is green the algorithm includes determining whether any of the relevant reference vehicles have transmitted any Basic Safety Message (BSM) signals at step 714. BSM signals may data that is indicative of upcoming vehicle maneuvers such as abrupt stops or evasive maneuver lane changes. According to some examples, BSM signals are transmitted V2V using DSRC communication. More specifically, activation of one or more vehicle safety system may trigger an event broadcast message such as a present or imminent abrupt stop to nearby vehicles. At 716 the algorithm includes calculating a time until the path of the host vehicle is clear. This calculation may include any stoppage indications provided by intervening reference vehicles between the host vehicle and the traffic intersection. In the case of a green traffic signal state, obstructions to the host vehicle may be due to one or more intervening reference vehicles in the path between the host vehicle and the traffic light.

If no BSM transmissions are received from reference vehicles at step 714, the algorithm includes making a determination at step 718 regarding whether the host vehicle will arrive at the intersection before the traffic signal changes to a red state (i.e., whether Time To Next State≥Time To Arrival). If the time until the next signal change is longer than the time required for the host vehicle to arrive at the intersection, there may not be an upcoming stop due to the traffic signal maintaining a green state for long enough for the host vehicle to clear the intersection. In this case the time to clear path is set to zero at step 720, implying the path is presently clear. In turn, the engine is maintained on at step 722.

If at step 718 the traffic signal will change state from green to red prior to the host vehicle arriving at the intersection (i.e., Time To Next State<Time To Arrival), the algorithm includes planning for the upcoming stop. At step 716 the algorithm includes calculating the time to clear path. This time may include the obstruction time due to intervening reference vehicles while approaching the intersection, the total time of the red state of the traffic signal, and any latency of departure of the intervening reference vehicles once the traffic signal changes back to a green state.

If the current traffic signal state is not green at step 712, the algorithm may include triggering off of a red traffic single state at step 724. The algorithm includes preparing for the upcoming stop and assessing any opportunistic benefits to deactivating the engine of the host vehicle. At step 726, the algorithm includes assessing whether any BSM signals have been received from a reference vehicle. As discussed above, the BSM signals may be indicative of imminent reference vehicle maneuvers which may impact the deceleration and/or stop time of the reference vehicle. Based at least on BSM signals, the traffic signal state, location of the intersection, coordinates and trajectories of the reference vehicles, and coordinates and trajectory of the host vehicle, the algorithm includes calculating a time until the path of the host vehicle is clear at step 716.

If no specific BSM signals were received at step 728, the algorithms includes compiling the data associated with any intervening reference vehicles prior to calculating a time until the path of the host vehicle is clear at step 716.

If no intervening reference vehicles are present at step 728, the time until the path of the host vehicle is clear at step 730 may simply be the time until the traffic signal changes from red to green (i.e., Time To Clear Path=Time To Next State). In this case no further time to clear path calculation is required as there are no obstructions aside from the traffic signal itself.

Once a time to a clear path of the host vehicle is calculated (either at step 716 or at step 730) a total stop time $T_{stop}$ is calculated at step 732. As discussed above, $T_{stop}$ accounts for latency in deceleration and acceleration of the host vehicle and reference vehicles, combined with relevant traffic signal state changes. If the stop time $T_{stop}$ is sufficiently long, it may present an opportunity to conserve fuel by deactivating the engine as early as possible with the advantage of knowing with a degree of certainty when propulsion demand will undergo a resurgence. If the stop time $T_{stop}$ is less than or equal to a predetermined time threshold at step 734, there is insufficient time to warrant an engine deactivation. At step 722 the engine is maintained on in spite of the host vehicle coming to a stop. If at step 734 the stop time $T_{stop}$ is greater than the predetermined time threshold, the engine is shut off at step 736 to reduce fuel consumption during the stop time of the host vehicle.

Figure 8:
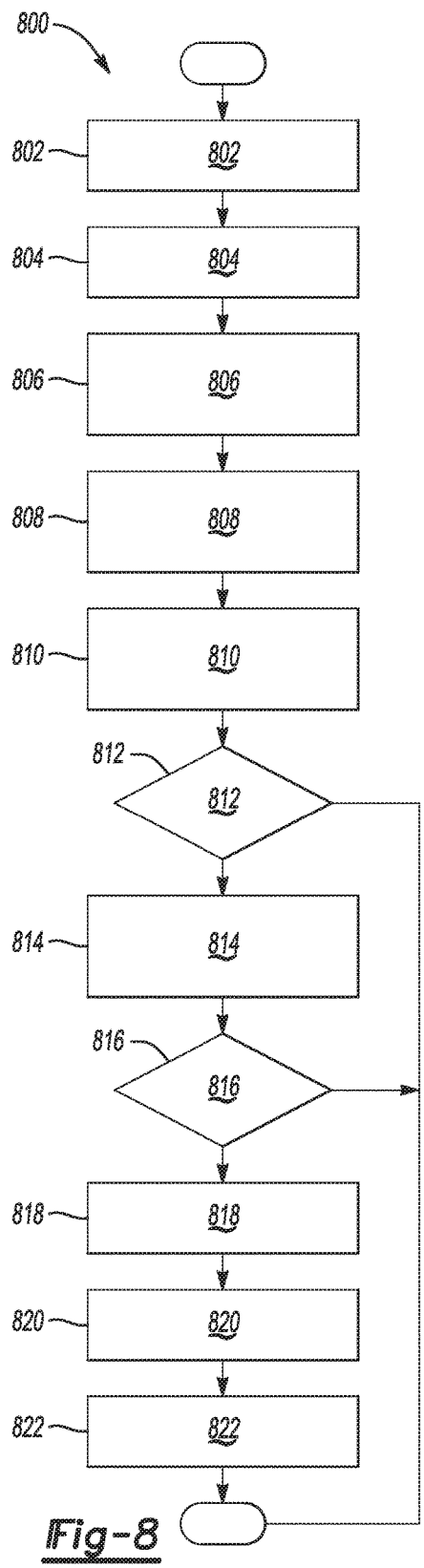
FIG. 8 is a flowchart of a method of determining a host vehicle clear path time.

Referring to FIG. 8, and as discussed above (e.g., in reference to step 710), the vehicle controller is programmed to use any of a number of different coordinate system conversions to determine the position of host vehicles, traffic signals, and/or other infrastructure devices in reference to the host vehicle. Algorithm 800 depicts an example method of using coordinate system conversions in a process of forecasting the stop time of the host vehicle. At step 802 the algorithm includes collecting GPS coordinates of each of the host vehicle any number of nearby reference vehicles.

At step 804 the algorithm includes collecting the path history of the reference vehicles. Each of the location information and the preceding path history may be used to determine relative distances and vehicle trajectories. As discussed above, these data may in turn may be used to determine a time to a clear path, and thus a duration over which no acceleration is required from the host vehicle. GPS coordinates of locations and path histories are then converted to earth-centered earth-fixed (ECEF) coordinates. As is known, ECEF systems are Cartesian coordinate system having a center of the earth at an origin. ECEF coordinate systems may be beneficial because they may give more precise location and relative distance values compared to GPS only. Additionally, ECEF coordinate systems may simplify navigation calculations required to be performed at the host vehicle.

At step 806 each of the GPS latitude (i.e. LAT), longitude (i.e., LONG), and altitude (i.e., A) values are converted to ECEF coordinates $X_{ECEF}$, $Y_{ECEF}$, and $Z_{ECEF}$. The conversions are characterized by equations (1), (2), and (3) below, respectively.

$$X_{ECEF} = \left(\frac{r_e}{NORM} + A\right) * \cos(LAT) * \cos(LONG) \tag{1}$$

$$Y_{ECEF} = \left(\frac{r_e}{NORM} + A\right) * \cos(LAT) * \sin(LONG) \tag{2}$$

$$Z_{ECEF} = \left(\frac{r_e(1 - e^2)}{NORM} + A\right) * \sin(LAT) \tag{3}$$

In the equations above $r_e$ is the radius of the earth, and is approximately 6,378,137 meters. And, $e^2$ is a constant equal to approximately $6.694 \times 10^{-3}$. NORM is based on the GPS coordinates and is characterized by equation (4) below.

$$NORM = \sqrt{1 - e^2 * \sin^2(LAT)} \tag{4}$$

The ECEF coordinates are then translated into an east-north-up (ENU) coordinate system. A "scene" or "local" coordinate system is essentially an arbitrary, Cartesian coordinate system. Although such coordinate systems themselves may be arbitrary, a scene coordinate system still supports geolocation because the origin of the system is tied to a particular geolocation point. When translated to a geolocated tie point, the scene +Y axis corresponds to North and the scene +X corresponds to East. An ENU coordinate system may also be considered a "flat earth" system that uses linear X, Y and Z coordinates to locate elements with respect to the coordinate systems origin. This coordinate system may be best suited for smaller areas where the curvature of the earth is not a concern (e.g., less than 4 km). Such small areas may allow for the use of Euclidean geometry with insignificant error.

At step 808 the ECEF coordinates $X_{ECEF}$, $Y_{EcEF}$, and $Z_{ECEF}$ of each of the reference vehicles are converted to ENU coordinates having a tie point and a frame of reference back to the host vehicle. The conversions are characterized by equations (5) and (6) below.

$$X_{ENU} = -(X_{RV} - X_{HV}) * \sin(LONG_{HV}) + (Y_{RV} - Y_{HV}) * \cos(LONG_{HV}) \tag{5}$$

$$Y_{ENU} = -(X_{RV} - X_{HV}) * \sin(LAT_{HV}) * \cos(LONG_{HV}) - (Y_{RV} - Y_{HV}) * \sin(LAT_{HV}) * \sin(LONG_{HV}) + (Z_{RV} - Z_{HV}) * \cos(LAT_{HV}) \tag{6}$$

The host vehicle may detect the presence of any number of nearby reference vehicles. And, the detected vehicles may be travelling in any number of different directions—all of which won't necessarily cause an upcoming stop of the host vehicle. At step 810, and discussed in more detail below, the vehicle controller may be programmed to calculate the location and travel direction of each of the detected reference vehicles using a frame of reference relative to the host vehicle.

At step 812 if none of the detected reference are within the path of the host vehicle, they may be disregarded and no further action taken based on advanced engine deactivation based on location of nearby reference vehicles. However if one or more of the reference vehicles positioned ahead of the host vehicle along the upcoming path, the algorithm includes accounting for the total effect of any number of preceding vehicles. At step 814 a total number of n vehicles within the path is accounted for out of the total population of detected vehicles.

At step 816 if at least one of the reference vehicles is stopped, the algorithm includes calculating the distance to the nth vehicle (i.e., the last of a series of reference vehicles along the path) at step 818. If the nth vehicle has not yet come to a full stop, the algorithm may estimate an upcoming stopped location of the nth reference vehicle based on the closest actual obstruction in the path. In some examples, a preceding reference vehicle may already be stopped, so the controller may aggregate spacing between vehicles to estimate a final position of the nth vehicle in the series. In other examples a traffic device may present the path obstruction, and the controller may similarly aggregate spacing between all intervening reference vehicles to estimate an upcoming stop position of the last vehicle of the series.

At step 820 the algorithm includes forecasting a stop duration of the last vehicle of the series of intervening reference vehicles. As discussed above, as each preceding vehicle departs from a stopped position, there is some delay before the subsequent vehicle departs once its path is clear. At step 822 the algorithm include calculating when the path of the host vehicle is clear. According to some examples, a controller is programmed to calculate the path clearance time of the host vehicle based on an estimation of when last of the series of reference vehicles will depart from an intervening stop location.

Figure 9:
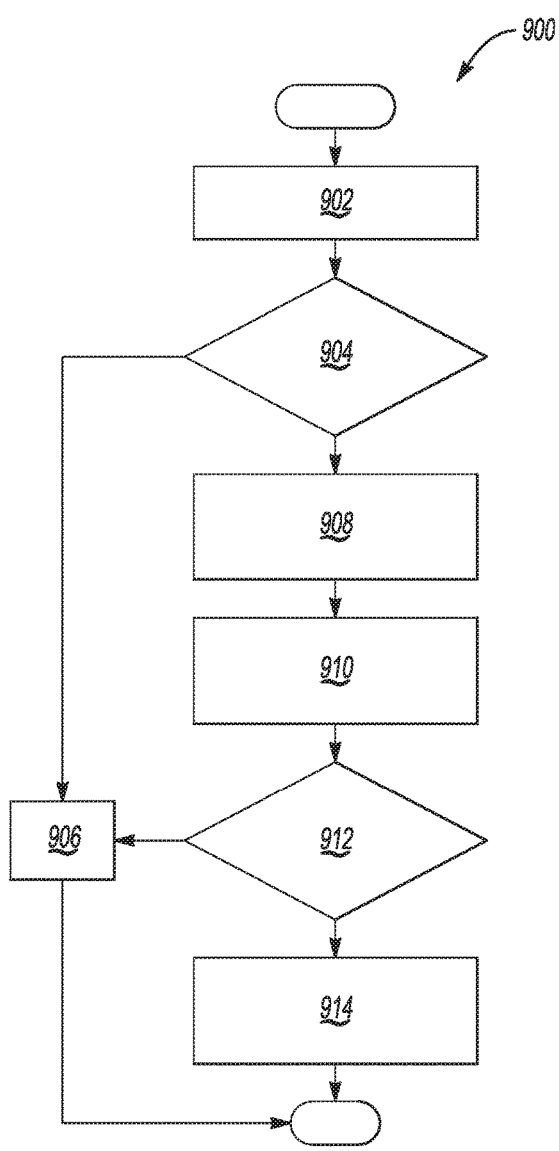
FIG. 9 is a flowchart of a method of determining whether a reference vehicle is within a path of a host vehicle.

Referring to FIG. 9, algorithm 900 includes an example determination of the travel direction and the relative location of a detected reference vehicle to support the prediction of whether the reference vehicle will cause an upcoming stoppage of the host vehicle. At step 902 the algorithm includes calculating difference between a heading direction angle of the host vehicle and heading direction angle of any of a number of detected reference vehicles. According to at least one example, the heading direction of a reference vehicle is derived from the path history of the reference vehicle. The calculation may be characterized by equation (7) below.

$$\Delta_{Heading} = \text{Heading\_HV} - \text{Heading\_RV} \tag{7}$$

If at step 904 the difference in heading angle between the host vehicle and a reference vehicle $\Delta_{Heading}$ is less than a predetermined maximum heading angle threshold, it is an indication that the two vehicles are traveling in generally the same direction. In one example, the predetermined heading threshold is about ±10 degrees. If the vehicles are not traveling in generally the same direction at step 804 the algorithm may include ignoring the reference vehicle at step 906.

If at step 904, the vehicles are traveling in generally the same direction, the algorithm includes calculating a distance between two or more path history points at step 908. In this way, the trajectory of the reference vehicle may be determined. At step 910, the algorithm includes calculating a separation distance between the host vehicle and the reference vehicle. Based on the current separation distance and the calculated trajectory, the closing time between the vehicles may be determined. If at step 912 the separation distance is greater than a predetermined threshold, it may be determined that the reference vehicle is far enough away from the host vehicle to be discounted in engine start-stop calculations. When sufficient distance is present between the vehicles the reference vehicle may be ignored at step 906.

If at step 912 the relative separation distance between the vehicles is less than the predetermined threshold, the algorithm includes determining that the reference vehicle is ahead at step 914. Once a determination is made that a reference vehicle is ahead, the algorithm may feed certain data back to other algorithm portions discussed herein to support time to arrival estimations.

Figure 10:
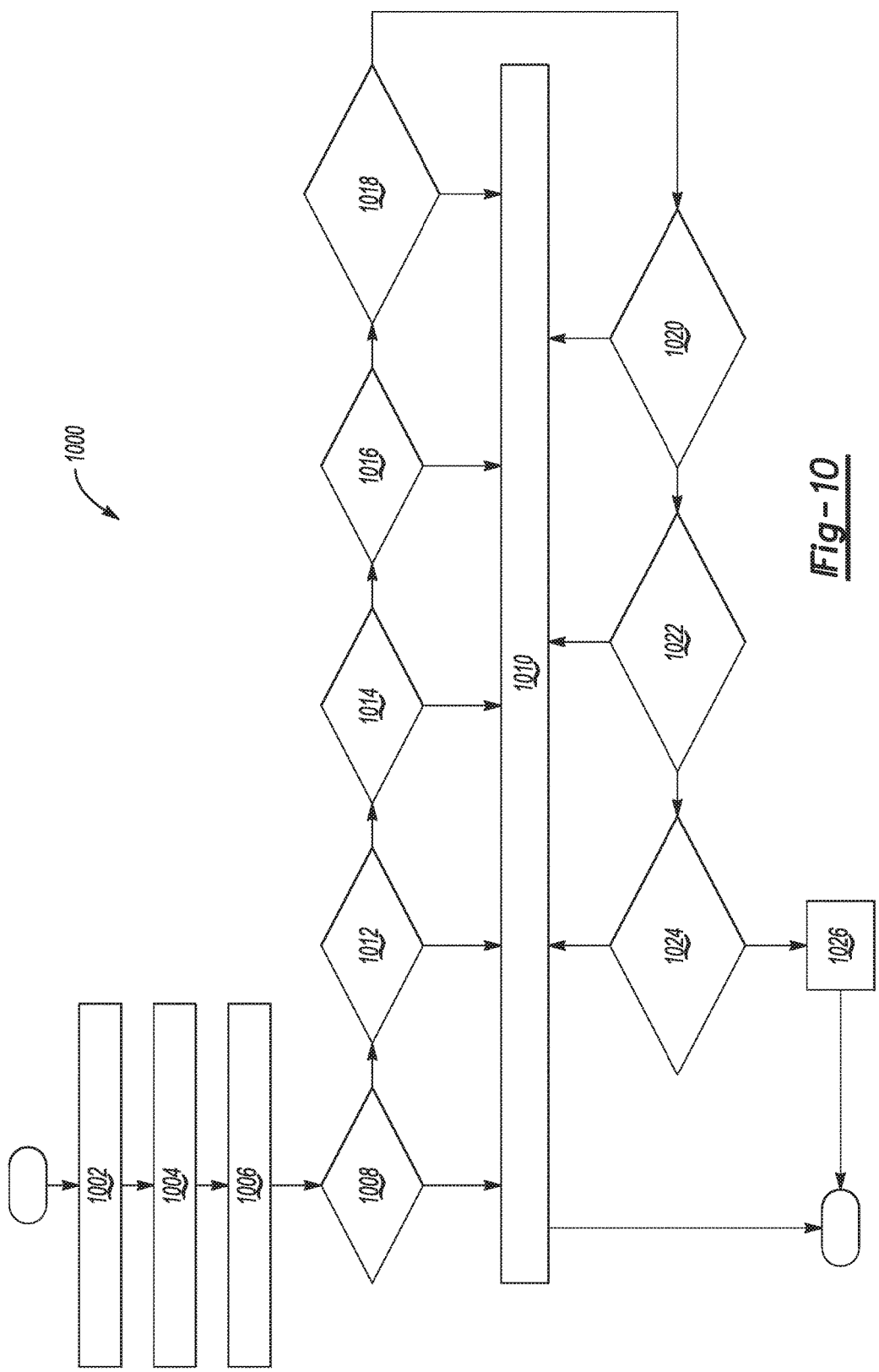
FIG. 10 is a flowchart of an alternative method of determining whether a reference vehicle is within a path of a host vehicle.

Referring to FIG. 10, method 1000 represents an alternate example algorithm for determining whether a detected reference vehicle is within a path of the host vehicle. At step 1002 the host vehicle receives location data from the detected reference vehicle. As discussed above, the location data may be included as part of a BSM signal transmitted from a reference vehicle.

The algorithm includes a procedure to compare the path of the host vehicle with paths of any number of reference vehicles. At step 1004 the algorithm includes converting the reference vehicle coordinates into a relative coordinate system having a frame of reference related to the travel direction of the host vehicle. In at least one example, the coordinates are transferred into an ENU coordinate system having an origin at the host vehicle. In other examples, a relative x-axis position $X_{RV}$ and a relative y-axis position $Y_{RV}$ of the reference vehicle are generated using equation (8) and equation (9) below, respectively. Raw coordinate values $X_{RV,raw}$ and $Y_{RV,raw}$ are converted to the relative values having a frame of reference back to the host vehicle, where $h_{HV}$ is the heading angle of the travel direction of the host vehicle.

$$X_{RV} = X_{RV,raw} * \cos(-h_{HV}) + Y_{RV,raw} * \sin(-h_{HV}) \tag{8}$$

$$Y_{RV} = X_{RV,raw} * \sin(-h_{HV}) + Y_{RV,raw} * \cos(-h_{HV}) \tag{9}$$

The algorithm further includes a discrimination process by which the location and direction of a given reference vehicle is compared against the host vehicle. An initial assessment may be performed regarding whether the heading direction angle $h_{HV}$ is along a rectangular coordinate system axis of the host vehicle frame of reference. At step 1008 the algorithm includes determining whether the host vehicle heading angle is along a first axis corresponding to zero degrees. If the host vehicle is heading along the first axis at zero degrees, and the relative $Y_{RV}$ value of the reference vehicle position is equal to or greater than zero, it may be determined that the two vehicles are travelling along the same path at step 1010 and/or have an upcoming path intersection causing the host vehicle to come to a stop. As discussed above, once the host vehicle and the reference vehicle are determined to be traveling in the same direction, the algorithm may be arranged to calculate separation distances and closing times as discussed above to support optimizing the engine-off duration.

If the above-mentioned conditions are not met at step 1008, the algorithm continues to poll whether other host vehicle heading angle conditions exist. At step 1012 if the vehicle is heading along a second axis corresponding 90 degrees at the same time as a reference vehicle has a relative $X_{RV}$ value equal to or greater than zero, the vehicles may be deemed to be possible travelling in substantially the same direction at step 1010.

At step 1014 if the vehicle is heading along a third axis corresponding to 180 degrees at the same time as a reference vehicle has a relative $Y_{RV}$ value equal to or less than zero, the vehicles may be deemed to be travelling in substantially the same direction at step 1010.

At step 1016 if the vehicle is heading along a fourth axis corresponding to 270 degrees at the same time as a reference vehicle has a relative $Y_{RV}$ value equal to or less than zero, the vehicles may be deemed to be possible travelling in substantially the same direction at step 1010.

If it is determined that the host vehicle is not travelling along any of the four primary axes of the rectangular coordinate system, the algorithm includes continuing to poll of host vehicle heading directions within any of the quadrants between the primary axes. At step 1018, the algorithm includes making an assessment of whether the host vehicle heading direction angle $h_{HV}$ is within a first quadrant between zero degrees and 90 degrees. At the same time, if the relative $Y_{RV}$ value is equal to or greater than a relative comparator based on $X_{RV}$ and the heading direction angle $h_{HV}$ (i.e., $Y_{RV} \geq -X_{RV}*\tan(h_{HV})$), the reference vehicle is deemed to be in the first quadrant in which the host vehicle is heading and potentially cause an upcoming stop. Thus the algorithm may deem the two vehicles to be travelling in substantially the same direction at step 1010.

If the host vehicle is not travelling within the first quadrant at step 1018, the algorithm includes polling at step 1020 whether the host vehicle heading direction angle is within a second quadrant between 90 degrees and 180 degrees. At the same time, if the relative $Y_{RV}$ value is equal to or less than the relative comparator based on $X_{RV}$ and the heading direction angle $h_{HV}$ (i.e., $Y_{RV} \leq -X_{RV}*\tan(h_{HV})$), the reference vehicle is deemed to be in the second quadrant in which the host vehicle is heading and potentially cause an upcoming stop. Thus the algorithm may deem the two vehicles to be travelling in substantially the same direction at step 1010.

If the host vehicle is not travelling within the second quadrant at step 1020, the algorithm includes polling at step 1022 whether the host vehicle heading direction angle is within a third quadrant between 180 degrees and 270 degrees. At the same time, if the relative $Y_{RV}$ value is equal to or less than a relative comparator based on $X_{RV}$ and the heading direction angle $h_{HV}$ (i.e., $Y_{RV} \leq -X_{RV}*\tan(h_{HV})$), the reference vehicle is deemed to be in the third quadrant in which the host vehicle is heading and potentially cause an upcoming stop. Thus the algorithm may deem the two vehicles to be travelling in substantially the same direction at step 1010.

If the host vehicle is not travelling within the third quadrant at step 1022, the algorithm includes polling at step 1024 whether the host vehicle heading direction angle is within a fourth quadrant between 270 degrees and 360 degrees. At the same time, if the relative $Y_{RV}$ value is equal to or greater than the relative comparator based on $X_{RV}$ and the heading direction angle $h_{HV}$ (i.e., $Y_{RV} \geq -X_{RV}*\tan(h_{HV})$), the reference vehicle is deemed to be in the third quadrant in which the host vehicle is heading and potentially cause an upcoming stop. Thus the algorithm may deem the two vehicles to be travelling in substantially the same direction at step 1010.

If none of the prerequisite conditions are met at any of steps 1008, 1012, 1014, 1016, 1018, 1020, 1022, or 1024, the algorithm includes making a determination that the detected reference vehicle is not within the path of the host vehicle and will not cause an upcoming stop. Thus at step 1026 the algorithm includes ignoring the reference vehicle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A host vehicle comprising:
   a vehicle body with a plurality of road wheels;
   a combustion engine configured to provide a propulsion torque to drive one or more of the road wheels and thereby propel the host vehicle;
   a sensor configured to detect a reference vehicle; and
   a controller programmed to:
     determine a current host vehicle location and a current host vehicle heading of the host vehicle,
     receive data with location coordinates indicative of a reference vehicle location of the reference vehicle,
     determine a path between the current host vehicle location and an upcoming intersection, transform the location coordinates of the reference vehicle location into transformed location coordinates complementary with a coordinate system relative to the current host vehicle location and heading, determine if the reference vehicle will move within the path ahead of the host vehicle and stop by estimating a trajectory path of the reference vehicle based on the transformed location coordinates of the reference vehicle location, in response to the reference vehicle moving within the path ahead of the host vehicle, forecast an intervening stop location and a path clearance time at which the host vehicle is determined to traverse the upcoming intersection, reduce an output of and/or deactivate the combustion engine prior to the host vehicle arriving at the intervening stop location in response to the path clearance time being greater than a predetermined time threshold, receive data indicative of a stopped state of the reference vehicle when stopped at the intervening stop location between the current host vehicle location and an infrastructure traffic device, and forecast when the reference vehicle will depart from the intervening stop location, wherein a duration of the host vehicle at the intervening stop location is based on the forecast of when the reference vehicle will depart from the intervening location.

2. The host vehicle of claim 1, wherein the controller is further programmed to receive signal phase and timing data from an infrastructure traffic device indicative of a traffic signal state and a time remaining for the traffic signal state, and wherein the path clearance time is based on the time remaining and the traffic signal state.

3. The host vehicle of claim 1, wherein the path clearance time is further based on a time at which the reference vehicle traverses the upcoming intersection prior to the host vehicle.

4. The host vehicle of claim 1, wherein the controller is further programmed to determine whether the reference vehicle will move within the path ahead of the host vehicle based on a difference between a first heading direction angle of the host vehicle and a second heading direction angle of the reference vehicle.

5. The host vehicle of claim 4, wherein the controller is further programmed to determine whether the reference vehicle will move within the path by applying the transformed location coordinates of the reference vehicle position to a local coordinate system having a frame of reference relative to the host vehicle.

6. The host vehicle of claim 4, wherein the controller is further programmed to disregard the reference vehicle in response to the difference between the first heading direction angle and the second heading direction angle being greater than an angle threshold.

7. The host vehicle of claim 4, wherein the second heading direction angle of the reference vehicle is based on a trajectory of path history points of the reference vehicle.

8. The host vehicle of claim 1, further comprising a transceiver configured to receive signal phase and timing (SPAT) data from the infrastructure traffic device, wherein the controller is further programmed to:

receive SPAT data indicative of a traffic signal state and a time remaining for the traffic signal state for a traffic device at the upcoming intersection, calculate the duration of the host vehicle at the intervening stop location further based on the traffic signal state and the time remaining; and reduce the engine output of the combustion engine prior to arrival at the traffic device in response to the stop duration being greater than a time threshold.

9. The host vehicle of claim 1, wherein the controller is further programmed to receive, from the reference vehicle, a basic safety message (BSM) signal indicative of an abrupt vehicle stop or an evasive maneuver or a lane change in the path ahead of the host vehicle, and wherein the path clearance time is further based on the BSM signal.

10. The host vehicle of claim 1, wherein the controller is further programmed to determine a predicted stop location of the intervening reference vehicle between the host vehicle and the upcoming intersection, wherein the intervening stop location of the host vehicle is based on the predicted stop location of the intervening reference vehicle.

11. The host vehicle of claim 10, wherein the controller is further programmed to determine a duration of the host vehicle at the intervening stop location based on an estimated time at which a last vehicle of a series of reference vehicles in the path will depart from a respective intervening stop location between the host vehicle and the upcoming intersection.

12. The host vehicle of claim 1, wherein the controller reducing the output of the combustion engine includes cutting off a fuel supply during deceleration, modifying a transmission gear ratio shift schedule, and/or deactivating a cylinder of the combustion engine.

13. A method of controlling a propulsion system of a host vehicle, the host vehicle including a vehicle body, a plurality of road wheels, and an engine operable to drive one or more of the road wheels, the method comprising:

determining a current host vehicle location and a current host vehicle heading of the host vehicle;

receiving data with location coordinates indicative of a reference vehicle location of a reference vehicle;

determining a path between the current host vehicle location and an upcoming traffic stop location;

transforming the location coordinates of the reference vehicle location into transformed location coordinates complementary with a coordinate system relative to the current host vehicle location and heading;

determining if the reference vehicle will move within the path ahead of the host vehicle and stop by estimating a trajectory path of the reference vehicle based on the transformed location coordinates of the reference vehicle location;

forecasting an intervening stop location of the host vehicle and a path clearance time at which the host vehicle is determined to traverse the upcoming traffic stop location in response to the reference vehicle moving within the path ahead of the host vehicle;

reducing an engine output of and/or deactivating the engine prior to the host vehicle arriving at the intervening stop location in response to the path clearance time being greater than a predetermined threshold, receiving data indicative of a stopped state of the reference vehicle when stopped at the intervening stop location between the current host vehicle location and an infrastructure traffic device, and forecasting when the reference vehicle will depart from the intervening stop location, wherein a duration of the host vehicle at the intervening stop location is based on the forecasting of when the reference vehicle will depart from the intervening location.

14. The method of claim 13, further comprising determining the upcoming traffic stop location based on data transmitted from the infrastructure traffic device indicative of a traffic signal state.

15. The method of claim 13, wherein the path clearance time is based on an occurrence time of an upcoming traffic signal state of the infrastructure traffic device at the upcoming traffic stop location.

16. The method of claim 13, wherein the path clearance time is based on when the reference vehicle traverses the upcoming traffic stop location.

17. The method of claim 13, further comprising receiving data indicative of a location and a trajectory of each of a series of reference vehicles along the path, and wherein the path clearance time is based on when a last one of the vehicles in the series of reference vehicles departs from a second intervening stop location.

18. The method of claim 13, wherein reducing the engine output includes cutting off a fuel supply to the combustion engine during deceleration, modifying a transmission gear ratio shift schedule of a transmission operatively connected to the combustion engine, and/or deactivating at least one cylinder of the combustion engine.

19. The method of claim 13, further comprising detecting whether the reference vehicle will move within the path based on a comparison of a first trajectory of the host vehicle and a second trajectory of the reference vehicle.

* * * * *